United States Patent [19]

Parrillo

[11] Patent Number: 5,442,553
[45] Date of Patent: Aug. 15, 1995

[54] WIRELESS MOTOR VEHICLE DIAGNOSTIC AND SOFTWARE UPGRADE SYSTEM

[75] Inventor: Louis C. Parrillo, Austin, Tex.

[73] Assignee: Motorola, Schaumburg, Ill.

[21] Appl. No.: 976,750

[22] Filed: Nov. 16, 1992

[51] Int. Cl.⁶ ............................................. H04B 1/38
[52] U.S. Cl. ..................... 364/424.04; 364/424.01; 364/424.02; 364/424.03; 364/551.01; 395/2.83; 395/2; 379/144; 379/59; 379/93
[58] Field of Search ............ 364/424.04, 424.03, 364/551.01, 424.01, 513, 550, 138, 431.12, 424.02, 424.1, 424.07, 403; 379/59, 144, 145, 147, 63, 98, 58; 395/325, 84, 86, 99, 95, 88, 163, 575; 180/169; 318/568.12; 123/479

[56] References Cited

U.S. PATENT DOCUMENTS

| | | | |
|---|---|---|---|
| 4,344,136 | 8/1982 | Panik | 364/424 |
| 4,398,258 | 8/1983 | Naitoh et al. | 364/551 |
| 4,654,867 | 3/1987 | Labedz et al. | 379/59 |
| 4,853,850 | 8/1989 | Krass, Jr. et al. | 364/424.1 |
| 4,989,146 | 1/1991 | Imajo | 364/424.04 |
| 4,996,643 | 2/1991 | Sakamoto et al. | 364/424.03 |
| 5,005,142 | 4/1991 | Lipchak et al. | 364/550 |
| 5,249,218 | 9/1993 | Sainton | 379/59 |
| 5,255,208 | 10/1993 | Thakore et al. | 364/424.04 |
| 5,270,931 | 12/1993 | Appleford | 364/424.04 |
| 5,272,747 | 12/1993 | Meads | 379/59 |
| 5,276,619 | 1/1994 | Ohara et al. | 364/424.04 |
| 5,278,759 | 1/1994 | Berra et al. | 364/424.01 |
| 5,289,378 | 2/1994 | Miller et al. | 364/424.04 |
| 5,307,271 | 4/1994 | Everett, Jr. et al. | 364/424.02 |

Primary Examiner—Kevin J. Teska
Assistant Examiner—Jacques Louis-Jacques
Attorney, Agent, or Firm—Eugene A. Parsons

[57] ABSTRACT

A transceiver and additional memory are connected to the microprocessor in a vehicle so that all, or selected portions, of operating data is stored in the memory and periodically transmitted to a remote station. The data is diagnosed at the remote station and, for minor repairs, a fix is transmitted back to the vehicle. The information for a large population of vehicles is used by the manufacturer to determine if a problem is generic to a specific model and to generate repairs and/or model changes.

15 Claims, 2 Drawing Sheets

WIRELESS MOTOR VEHICLE DIAGNOSTIC AND SOFTWARE UPGRADE SYSTEM

The present invention pertains to the diagnosis and repair of mobile and stationary vehicles and more specifically to the diagnosis, repair and/or system upgrade in the field of mobile and stationary vehicles.

BACKGROUND OF THE INVENTION

The vehicle industry, and particularly the automotive industry, is a very dynamic industry with constant change and improvement occurring. It is common in the automotive industry to receive information on problems and desirable features from the manufacturer's repair shops and from the field by way of independent repair shops, where possible.

Problems become evident in repair shops when a specific problem reoccurs many times. Desirable new features may be determined by poling customers, conversing with customers at repair shops, etc. However, this process has a relatively slow correction rate and much information is not obtained that might otherwise result in improved performance and much more satisfied customers.

SUMMARY OF THE INVENTION

It is a purpose of the present invention to provide a new and improved wireless diagnostic system for mobile and stationary vehicles.

It is a further purpose of the present invention to provide a new and improved wireless software upgrade system for mobile and stationary vehicles.

It is a further purpose of the present invention to provide a new and improved wireless mobile and stationary vehicle diagnostic and software upgrade system with a relatively fast response time and improved accuracy.

The above described problems and others along with the above purposes and others are realized in a method of diagnosis and software upgrade in a vehicle with an engine and manual controls, including the steps of providing a plurality of sensors positioned to sense a variety of dynamic data and a plurality of mechanical controls coupled to the vehicle and the engine for mechanically controlling the operation of various components thereof, providing a microprocessor coupled to the plurality of mechanical controls and including programs to cause functioning of the mechanical controls in accordance with signals from the manual controls, the microprocessor further having access to a variety of selectable program constants, each program constant producing a modified functioning of the mechanical controls, collecting and sending the variety of dynamic data to a remote diagnostic station, receiving signals from the remote diagnostic station indicative of program changes, and selecting different program constants in response to the received signals.

The above described problems and others along with the above purposes and others are further realized in apparatus for performing the method of diagnosis and software upgrade in a vehicle.

BRIEF DESCRIPTION OF THE DRAWINGS

Referring to the drawings.

DESCRIPTION OF THE PREFERRED EMBODIMENT

Figure 1:
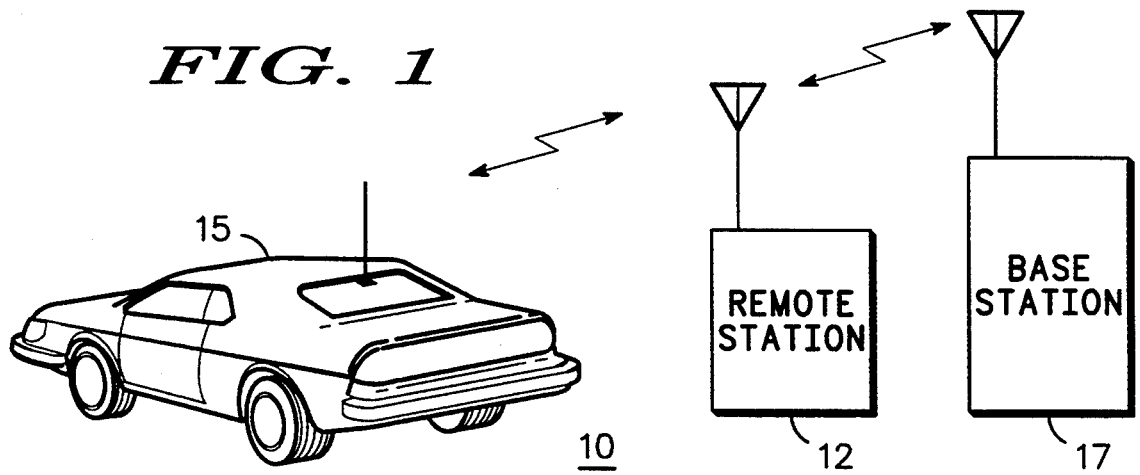
FIG.1 is a simplified diagram of a diagnostic and software upgrade system embodying the present invention.

Referring specifically to FIG.1 a simplified diagram of a diagnostic and software upgrade system 10 embodying the present invention is illustrated. Basically, system 10 includes a remote station 12 and a vehicle 15 which it is desired to monitor and to modify if it is determined, as a result of the monitoring, to be necessary. It should be noted that data is transmitted between remote station 12 and vehicle 15 by any convenient means, such as a cellular telephone, two-way radios, pagers, etc. Further, remote station 12 can be one of a plurality of stations permanently situated at prime cites in a particular area of a city (as in the present embodiment), or it can be one of a plurality of mobile units which travel a particular route.

As will become apparent presently, actual diagnosis of information received from vehicle 15, and others, can be performed at the remote station or at a base station 17 in communication with the plurality of remote stations. Generally, some of the information will be used to perform diagnosis and to transmit repair information back to vehicle 15, while potentially all of the information will go into a permanent storage for review and use in developing permanent changes to future models of the same, or advanced, vehicles.

Figure 2:
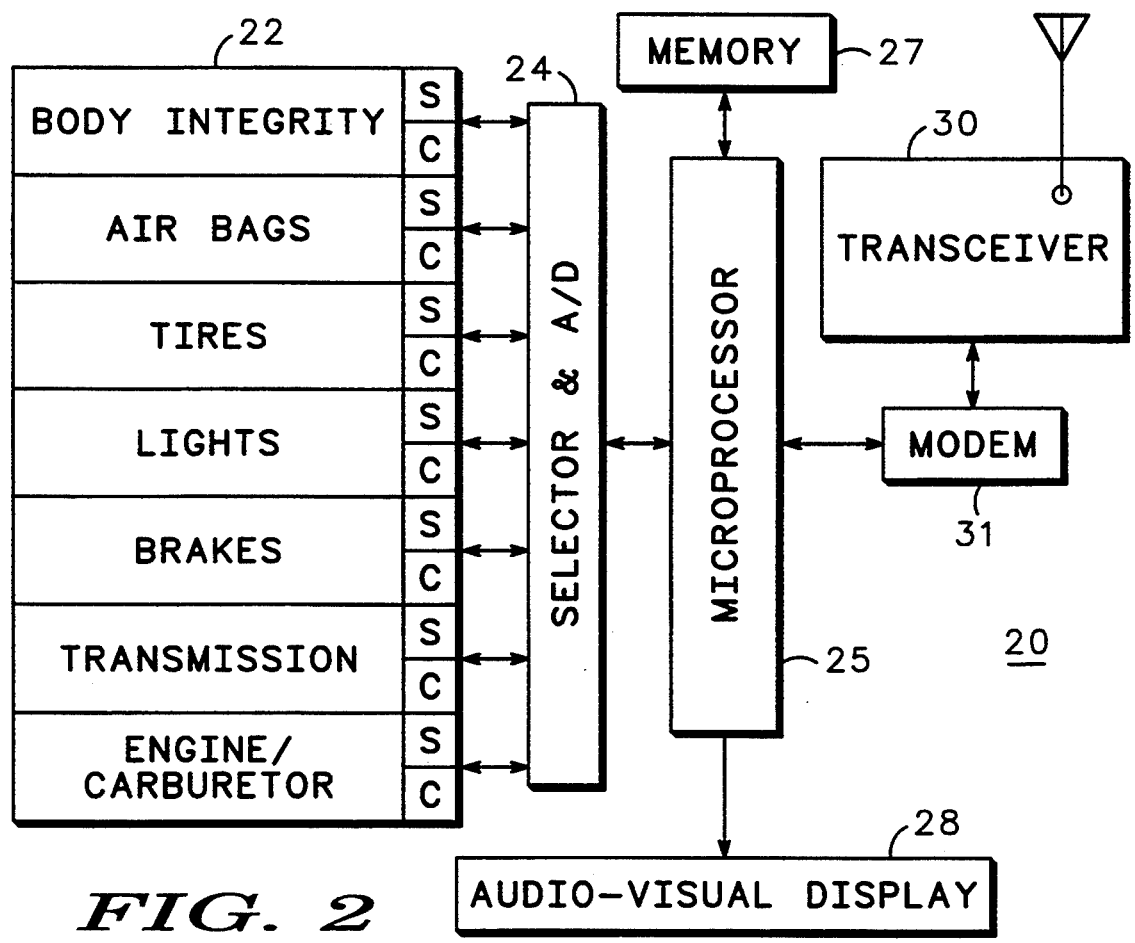
FIG.2 is a block diagram of the vehicular portion of the system illustrated in FIG. 1.

Referring to FIG. 2, a block diagram of the automotive portion 20 of system 10 is illustrated. Portion 20 includes a plurality of sensors, designated s, positioned to sense a variety of dynamic data from a plurality of components 22 of vehicle 15. Some examples of components 22 are: "body integrity" or status of the doors, windows, hood, trunk, etc of the various parts of vehicle 15; "air bags" or whether or not the air bags (if any) are ready to function; "tires" or whether the tires have the correct air pressure; "lights" or the status of the lights and whether they are ready to function; "brakes" or status of the emergency brake and whether all of the brakes are ready to function, possibly also including information as to how well they are functioning when applied; "transmission" or the status of the transmission, as well as the status of variables in the transmission including fluid level, etc.; and "engine/carburetor" including information such as engine R.P.M.s, fuel/air mixture, emissions and pollution content, etc. It will of course be understood by those skilled in the art that this list is only for purposes of example and, depending upon the vehicle and the components incorporated therein, additional and/or other dynamic data may be desired.

Portion 20 further includes a plurality of mechanical controls, designated c, coupled to some or all of components 22. The plurality of mechanical controls are utilized for mechanically controlling the operation of the various ones of components 22 to which they are attached. In some instances, such as body integrity, air bags and tires there may not be a control or the control may be only partial, for example locking the doors after vehicle 15 is moving. In some instances there may be more than one control, as will become apparent presently.

Also, vehicle 15 includes a plurality of manual controls designed to be operated by the driver and to mechanically control components 22 in accordance with signals from the manual controls. Typically such manual controls include a fuel pedal, a brake pedal, a shifting mechanism, light switch and dimmer, electric door locks, etc. In this specific embodiment the actual function of each of the various manual controls is performed by the control c associated with each component of components 22, as will become apparent presently.

The plurality of sensors and controls associated with components 22 of vehicle 15 are coupled to a selector and A/D converter 24 which in turn connects the plurality of sensors and controls to data inputs of a microprocessor 25. In some specific embodiments, selector and A/D converter 24 may actually be included in microprocessor 25 but the two are illustrated separately in this embodiment for ease of explanation. In general, microprocessor 25 controls (including the timing) selector and A/D converter 24, accepting data therefrom when available, and when microprocessor 25 is ready, and providing control information when necessary.

A memory 27 is connected to microprocessor 25 for receiving and storing dynamic data as it is received by microprocessor 25 from the sensors associated with components 22. The size of memory 27 is dependent upon the frequency with which stored data is communicated to remote station 12 and the amount of data being monitored. Further, memory 27 is connected to supply all stored data, or selected portions thereof, to microprocessor 25 on demand.

An audio-visual display 28 is connected to microprocessor 25 to provide a continuous supply of visual information to the driver of vehicle 15. In this embodiment the visual information includes the usual information available to the driver in a vehicle, i.e. speed, fuel remaining, status of lights, brakes, etc., and some information that is available only by operating controls (not shown) associated with audio-visual display 28, e.g. tire pressure, brake and transmission fluid level, miles travelled per gallon of fuel, etc.

A transceiver 30 is attached to microprocessor 25 through a modem 31. In this embodiment, transceiver 30 is a cellular phone that is supplied as a part of vehicle 12. However, transceiver 30 can be any convenient transceiver, such as a special miniature transceiver incorporated into automotive portion 20 only for the purpose of transmitting data to remote station 12 and receiving data therefrom. When utilizing a transceiver provided especially for the purpose of system 10, well known paging communication techniques can be utilized to insure communication with only the selected vehicle. In either instance, transceiver 30 is constructed, using well known techniques, to respond to remote station 12 only when interrogated and to provide all data stored in memory 27, or selected portions thereof.

Figure 3:
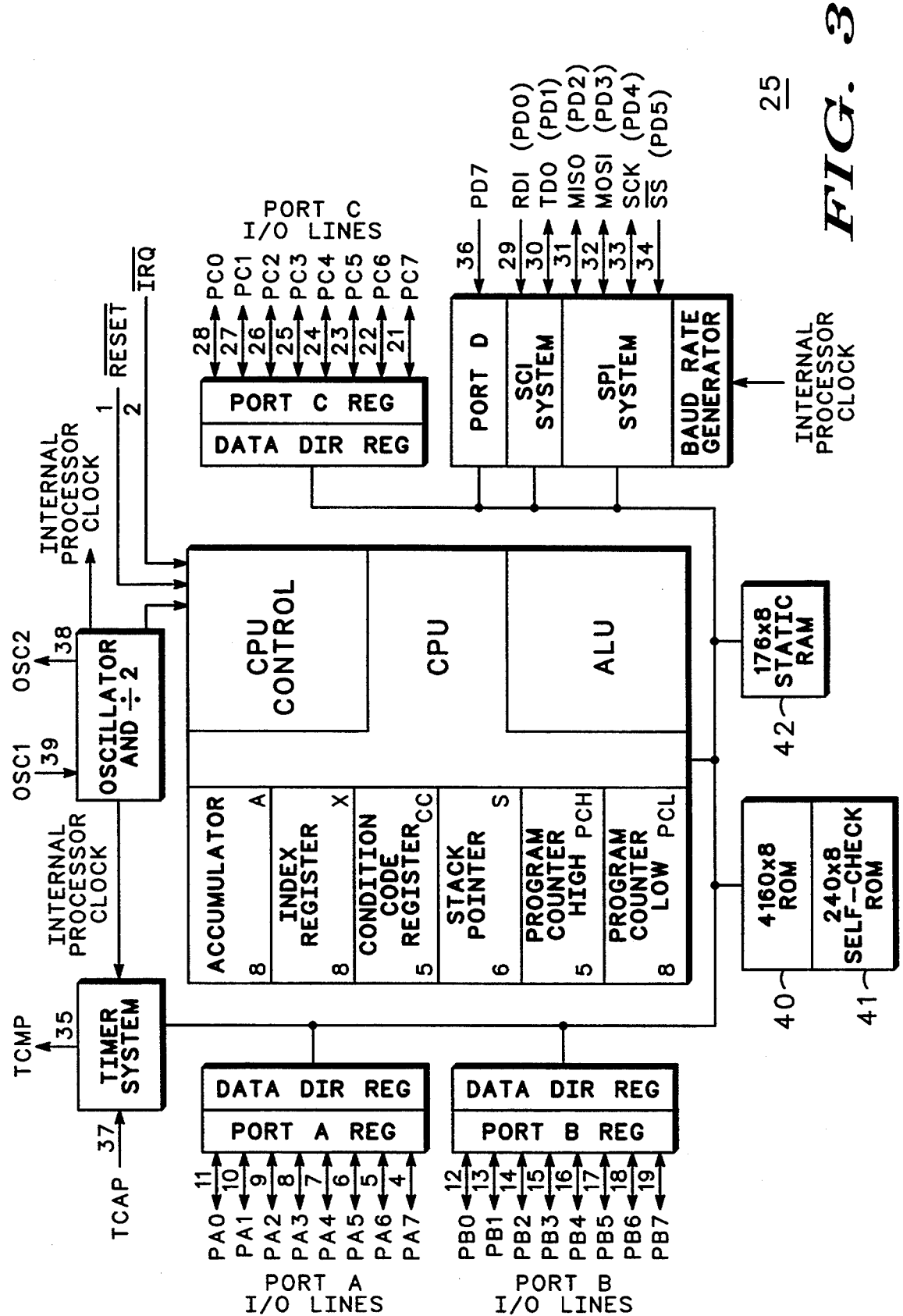
FIG. 3 is a detailed block diagram of a portion of FIG. 2

FIG. 3 illustrates a typical microprocessor utilized in automotive vehicles, which microprocessor is utilized in this specific embodiment as microprocessor 25. It will of course be understood by those skilled in the art that other and more complex microprocessors may be utilized in the future, but the microprocessor illustrated in FIG. 3 is utilized herein for purposes of explanation and because of its availability. Microprocessor 25, illustrated in FIG. 3, is a MC68HC05C4 8-bit single-chip microcomputer, manufactured by MOTOROLA, Inc. and is commercially available off the shelf. It should be understood that this embodiment is only for example and the vehicle could include controllers with electrically alterable, non-volatile memories, e.g. commercially available 68HC11, 68HC16, etc. That is, the controller can be virtually any 8 bit, 16 bit, etc. device/system having a non-volatile memory with functions which are remotely alterable using the present system.

Components 22 are connected, through selector and A/D converter 24, to either of a pair of eight bit input/output ports A and B. Memory 27 is connected to eight bit input/output port C. The decision as to whether ports A and B are receiving data from the sensors, (as well as which sensors), or supplying data to the controls is determined by the programming of microprocessor 25. Also, data is normally flowing into memory 27 from port C, except during the times that remote station 12 is interrogating vehicle 15, at which time data flows from memory 27 into port C.

The SCI systems block of microprocessor 25 is a full-duplex asynchronous serial communications interface with functionally independent transmitter and receiver that use the same data format and bit rate. The SCI system is provided with a variety of baud rates so that, for example, data can be stored at a first rate (e.g. real time) and transmitted to remote station 12 at a second, much faster rate. The receive data in (RDI) line is connected to a data output of modem 31 for receiving data from transceiver 30. The transmit data out (TDO) line is connected to modem 31 for supplying data to modem 31 for transmission by transceiver 30. Since the RDI line and TDO line are already designed for serial data, no conversion is necessary before connection to modem 31.

Microcomputer 25 contains internal memory including read-only-memories (ROMs) 40 and 41 and a random-access-memory (RAM) 42. It should be understood that a large variety of memories could be utilized, including "flash" EEPROMs, EPROMs, etc. Generally, ROM 40 contains programs utilized for the normal operation of vehicle 15. The programs utilize constants stored in RAM 42 to perform the required functions. As a very simplified example, Ram 42 contains the constant, 35 pounds of pressure, which is the desired tire pressure. Each time the sensors in the tires are interrogated by microprocessor 25 the stored program utilizes the stored constant, 35 pounds, to compare to the actual sensed tire pressure. If the pressure does not compare within a predetermined range contained in the program, audio-visual display 28 indicates that there is a problem. Similarly, an engine timing program provides energy to the spark plugs to detonate each cylinder at the correct time relative to the mechanical position of the piston in the cylinder. A preferred constant for this timing is again stored in RAM 42.

Through use and age, parts of vehicle 15 wear and change. This wear and change causes very slight, or gradual, changes in the timing (relative movement) of the mechanical parts in vehicle 15. Generally, this change can be so gradual that the operator may not even notice the diminished, or impaired, operation. However, the timing information, or history, is stored in memory 27 by microprocessor 25. Simultaneously, information from each of the other sensors 22 is stored in memory 27. It will be understood that, when specific programs are upgraded or new algorithms are developed/adapted, the upgrade or complete new program is transmitted to microprocessor 25 during a time that automotive portion 20 is not being used.

In the operation of the wireless diagnostic and software upgrade system, remote station 12 interrogates vehicle 15 at some time when it is not being used, for example during the night. Since transceiver 30 is a cellular telephone, remote station 12 has only to transmit the correct telephone number to interrogate vehicle 15. Utilizing a program in microprocessor 25, similar to a common answering machine, the interrogate message is received in microprocessor 25 and data stored in memory 27 is transmitted, by way of modem 31 and transceiver 30, to remote station 12. As an alternative, microprocessor 25 actuates transceiver 30 during selected times when vehicle 15 is not being used. In this way microprocessor 25 is programmed to periodically send information stored in memory 27 to remote station 12, rather than requiring remote station 12 to interrogate vehicle 15.

As an example, the history of the engine timing is received at remote station 12 and reviewed and analyzed. If it appears that the timing has deteriorated to the point that a change should be made, remote station 12 sends a message to vehicle 15 to change the timing constant in RAM 42 to a more appropriate constant. In the present embodiment this is accomplished by simply selecting a different constant of a variety of constants stored in RAM 42. It will of course be understood that a single timing constant could be stored in RAM 42 and remote station 12 could simply transmit a new constant to replace the old one. If the replacement system is utilized, RAM 42 must be a memory that is changeable by an appropriate signal, such as an EPROM, EEPROM, or the like. In either case, a message is displayed on display 28 after the repair advising the operator that vehicle 15 has been repaired.

Simultaneously, the information received from vehicle 15 is transmitted to base station 17 for general storage and diagnosis. This information is then used by the manufacturer to determine if a particular problem is generic to a specific model. In this way the manufacturer can remotely sample the internal databases of a population of similar vehicles, thus shortening the response time to diagnose and correct problems in the field. Thus, relatively simple problems can be diagnosed and, sometimes, repaired in the field. For major problems the owner can be contacted and the vehicle brought to a repair center. However, because the problem has already been diagnosed, the repair time is minimized. Further, the information is used in the next design phase of new vehicles to correct deficiencies or unnecessary margin in the design of components.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. A wireless diagnostic and software upgrade motor vehicle system, which system includes a vehicle with an engine and manual controls, the system comprising:
   a plurality of sensors positioned to sense a variety of dynamic data in the vehicle;
   a plurality of mechanical controls coupled to the vehicle and the engine for mechanically controlling the operation of various components thereof;
   a memory;
   a microprocessor coupled to the plurality of sensors and to the memory to receive the dynamic data and store the dynamic data in the memory, the microprocessor further being coupled to the plurality of mechanical controls and including programs to cause functioning of the mechanical controls in accordance with signals from the manual controls; and
   a transceiver coupled to the microprocessor to receive the dynamic data from the memory and transmit the dynamic data to a remote diagnostic station and to provide program upgrades to the microprocessor in response to signals received from the remote diagnostic station.

2. A wireless diagnostic and software upgrade motor vehicle system, which system includes a vehicle with an engine and manual controls, as claimed in claim 1, wherein the plurality of sensors include a sensor positioned to sense emission pollution content and the microprocessor has stored therein a plurality of program constants designed to alter emission pollution content.

3. A wireless diagnostic and software upgrade motor vehicle system, which system includes a vehicle with an engine and manual controls, as claimed in claim 1, wherein the microprocessor has stored therein an upgradeable software program.

4. A wireless diagnostic and software upgrade motor vehicle system, which system includes a vehicle with an engine and manual controls, as claimed in claim 1 wherein the transceiver includes a cellular telephone.

5. A wireless diagnostic and software upgrade motor vehicle system, which system includes a vehicle with an engine and manual controls, as claimed in claim 4 wherein the transceiver includes a modem connecting an output terminal of the microprocessor to an input of the cellular telephone.

6. A wireless diagnostic and software upgrade motor vehicle system, which system includes a vehicle with an engine and manual controls, as claimed in claim 1 wherein the plurality of sensors includes sensors for sensing a plurality of tire pressure, body integrity, air bags, lights, brakes and transmission operation.

7. In a vehicle including an engine and manual controls, a method of diagnosis and software upgrade comprising the steps of:
   providing a plurality of sensors positioned to sense a variety of dynamic data and a plurality of mechanical controls coupled to the vehicle and the engine for mechanically controlling the operation of various components thereof;
   providing a microprocessor coupled to the plurality of mechanical controls and including programs to cause functioning of the mechanical controls in accordance with signals from the manual controls, the microprocessor further including a variety of selectable program constants, each program constant producing a modified functioning of the mechanical controls;
   collecting and sending the variety of dynamic data to a remote diagnostic station;
   receiving signals from the remote diagnostic station indicative of program changes; and
   selecting different program constants in response to the received signals.

8. In a vehicle including an engine and manual controls, a method of diagnosis and software upgrade as claimed in claim 7 wherein the microprocessor provided further includes a memory connected thereto and the plurality of sensors are connected to the microprocessor, the method further including the step of providing a cellular telephone coupled to the microprocessor with the step of collecting the variety of dynamic data being performed by the microprocessor and the steps of sending and receiving being performed by the cellular telephone and the microprocessor.

9. In a vehicle including an engine and manual controls, a method of diagnosis and software upgrade as claimed in claim 7 including the step of utilizing the variety of dynamic data at the remote diagnostic station to determine required program changes and transmitting signals to the vehicle indicative of the program changes.

10. In a vehicle including an engine and manual controls, a method of diagnosis and software upgrade as claimed in claim 7 including the step of utilizing some of the variety of dynamic data at the remote diagnostic station to generate permanent changes in a next generation of the vehicle.

11. In a motor vehicle system including a vehicle with an engine and manual controls, a method of diagnosis and software upgrade comprising the steps of:
providing a plurality of sensors positioned to sense a variety of dynamic data and a plurality of mechanical controls coupled to the vehicle and the engine for mechanically controlling the operation of various components thereof;
providing a microprocessor coupled to the plurality of mechanical controls and including programs to cause functioning of the mechanical controls in accordance with signals from the manual controls, the microprocessor further having access to a variety of selectable program constants, each program constant producing a modified functioning of the mechanical controls;
collecting and transmitting the variety of dynamic data to a remote diagnostic station;
receiving, at the remote diagnostic station, the transmitted dynamic data and utilizing the dynamic data to diagnose operating problems;
transmitting, from the remote diagnostic station, signals indicative of different program constants;
receiving, at the vehicle, the transmitted signals from the remote diagnostic station indicative of program changes; and
selecting different program constants in response to the received signals.

12. In a motor vehicle system including a vehicle with an engine and manual controls, a method of diagnosis and software upgrade as claimed in claim 11 including the step of storing in a memory of the microprocessor the variety of selectable program constants.

13. In a motor vehicle system including a vehicle with an engine and manual controls, a method of diagnosis and software upgrade as claimed in claim 11 including the step of providing the variety of selectable program constants at the remote diagnostic station, selecting one of the variety of selectable program constants in response to diagnoses of operating problems and transmitting signals, from the remote diagnostic station, indicative of the selected program constant.

14. In a motor vehicle system including a vehicle with an engine and manual controls, a method of diagnosis and software upgrade comprising the steps of:
providing a plurality of mechanical controls coupled to the vehicle and the engine for mechanically controlling the operation of various components thereof;
providing a microprocessor coupled to the plurality of mechanical controls and including microprocessor programs to cause functioning of the microprocessor and the mechanical controls in accordance with signals from the manual controls;
transmitting, from the remote diagnostic station, signals indicative of microprocessor program changes;
receiving, at the vehicle, the transmitted signals from the remote diagnostic station indicative of the microprocessor program changes; and
changing the microprocessor programs in response to the received transmitted signals.

15. In a motor vehicle system including a vehicle with an engine and manual controls, a method of diagnosis and software upgrade comprising the steps of:
providing a plurality of sensors positioned to sense a variety of dynamic data and a plurality of mechanical controls coupled to the vehicle and the engine for mechanically controlling the operation of various components thereof;
providing a microprocessor coupled to the plurality of mechanical controls and including microprocessor programs to cause functioning of the microprocessor and the mechanical controls in accordance with signals from the manual controls;
collecting and transmitting the variety of dynamic data to a remote diagnostic station;
receiving, at the remote diagnostic station, the transmitted dynamic data and utilizing the dynamic data to determine the status of the microprocessor programs;
transmitting, from the remote diagnostic station, signals indicative of microprocessor program changes;
receiving, at the vehicle, the transmitted signals from the remote diagnostic station indicative of the microprocessor program changes; and
changing the microprocessor programs in response to the received transmitted signals.

* * * * *